United States Patent [19]
Littrell

[11] Patent Number: 5,977,483
[45] Date of Patent: Nov. 2, 1999

[54] CELLULAR UNIT FOR USE IN A WIRING DISTRIBUTION SYSTEM

[75] Inventor: Gary L. Littrell, Inverness, Ill.

[73] Assignee: Thomas & Betts Corporation, Memphis, Tenn.

[21] Appl. No.: 08/808,077

[22] Filed: Feb. 28, 1997

[51] Int. Cl.$^6$ ...................................................... H02G 3/28
[52] U.S. Cl. ........................... 174/95; 248/300; 285/325; 403/292
[58] Field of Search ................................ 174/70 R, 71 R, 174/72 C, 72 A, 72 R, 95, 96, 97, 98, 101, 48, 49; 285/325, 417, 424, 369; 52/220.5, 726.1; 248/300; 403/292, 293, 294

[56] References Cited

U.S. PATENT DOCUMENTS

| | | | |
|---|---|---|---|
| 3,426,802 | 2/1969 | Fork | 174/96 |
| 3,459,875 | 8/1969 | Fork | 174/96 |
| 3,592,956 | 7/1971 | Fork | 174/97 |
| 5,435,606 | 7/1995 | Navazo | 285/424 |

*Primary Examiner*—Kristine L. Kincaid
*Assistant Examiner*—Dhiru R Patel
*Attorney, Agent, or Firm*—Meroni & Meroni

[57] ABSTRACT

A cellular unit is disclosed for use in a wiring distribution system having at least two cellular units oriented in end to end abutting fashion. Each cellular unit includes a housing having a top structure and a bottom structure connected to one another. The top and bottom structures are adapted and configured to define elongated cells extending through the housing. The cells extend parallel to one another and have open ends at opposite ends of the housing. Structure is provided to extend horizontally outwardly from the housing parallel with the cells. The structure includes an outwardly extending portion engageable with an abutting cellular unit such that abutting ends of the cellular units form a butt joint. The outwardly extending portion extends across the butt joint to define at least one vertical side positioned between two laterally adjacent cells to prevent the ingress of wires at the butt joint from one of the laterally adjacent cells to the other laterally adjacent cell.

23 Claims, 4 Drawing Sheets

5,977,483

CELLULAR UNIT FOR USE IN A WIRING DISTRIBUTION SYSTEM

BACKGROUND OF THE INVENTION

1. Field of the Invention

The present invention relates generally to cellular units for use in wiring or electrical distribution systems. More particularly, the invention pertains to a cellular unit having an improved butt joint to prevent the existence of gaps between laterally adjacent cells of cellular units occurring at the butt joint.

2. Description of the Prior Art

Wiring, or electrical distribution systems are commonly used to provide a means to distribute various power and communication lines throughout a building. In many applications, such systems often include the use of cellular units which are secured upon a floor of a building or structure during construction. A layer of concrete is then poured upon floor to embed the cellular unit within. Various inlets or presets, which are connected to the cellular units, extend upwardly from the concrete to allow access to the various cells of the cellular units.

During installation, cellular units are placed in an end to end abutting fashion upon the floor. It has been found that butt joints formed between the ends of cellular units typically allow a gap therebetween. The exterior surface of the cellular units at these butt joints are commonly taped to the prevent the ingress of concrete, however, the gap between cells remains open at these butt joints. Consequently, the possibility exists that various wires pulled or feed through the cellular unit could crossover from one cell to another. Further, misalignment of the cellular units increases the possibility of such crossover and additionally creates the potential problem that raw metal edges of the misaligned cells at the butt joints can result in wire stripping as the wires are drawn across these edges.

As will be described in greater detail hereinafter, the cellular unit of present invention solves the aforementioned problems and employs a number of novel features that render it highly advantageous over the prior art.

SUMMARY OF THE INVENTION

Accordingly, it is an object of this invention to provide an improved butt joint between abutting cellular units.

Another object of this invention is to provide a cellular unit having an improved butt joint that is easy to use and install.

Still another object of this invention is to provide a cellular unit that can be produced in some embodiments without the need for any extensive redesigning of existing cellular units or equipment for producing same.

Yet another object of this invention is to provide cellular units that are adapted to assist in proper alignment of abutting cellular units and prevent the ingress or crossover of wires from one cell to a laterally adjacent cell.

To achieve the foregoing and other objectives, and in accordance with the purposes of the present invention a cellular unit is provided for use in a wiring distribution system having at least two cellular units oriented in end to end abutting fashion. The cellular unit includes a housing having a top structure and a bottom structure connected to one another. The top and bottom structures are adapted and configured to define elongated cells extending through the housing. The cells extend parallel to one another and have open ends at opposite ends of the housing. Structure is provided to extend horizontally outwardly from the housing parallel with the cells. The structure includes an outwardly extending portion engageable with an abutting cellular unit such that abutting ends of the cellular units form a butt joint with the outwardly extending portion extending across said butt joint to define at least one vertical side positioned between two laterally adjacent cells to prevent the ingress of wires at the butt joint from one of the laterally adjacent cells to the other laterally adjacent cell.

In accordance with an aspect of the invention, one of the top or bottom structures includes a pair of sidewall portions extending vertically and in a parallel spaced apart relation to one another. Each sidewall portion includes a pair of opposing sidewalls. The outwardly extending portion is comprised of a bracket having a pair of bracket sides in parallel spaced apart relation to one another. The opposing sidewalls on each sidewall portion are yieldable to allow a corresponding bracket side therebetween the opposing sidewalls in pressing engagement therewith. The outwardly extending portion of the bracket is engageable with sidewall portions of an abutting cellular unit.

Other objects, features and advantages of the invention will become more readily apparent upon reference to the following description when taken in conjunction with the accompanying drawings, which drawings illustrate several embodiments of the invention.

DETAILED DESCRIPTION OF THE PREFERRED EMBODIMENT

Figure 1:
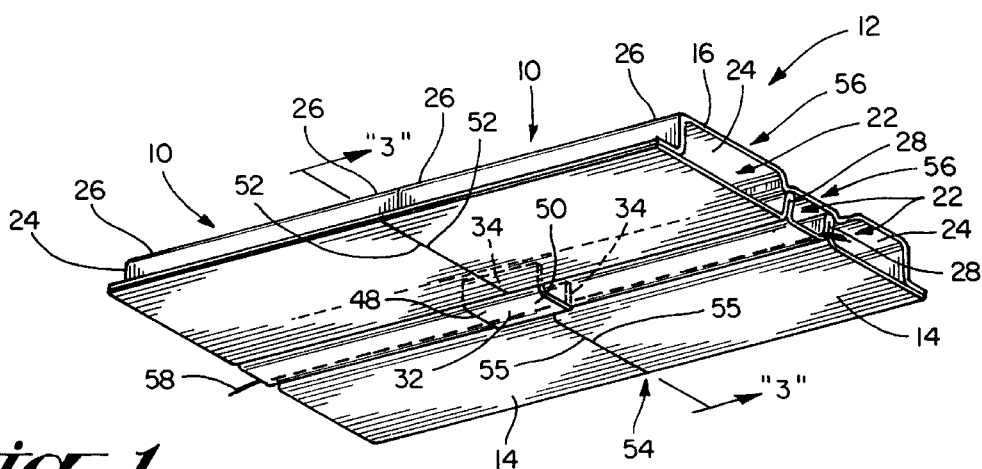
FIG. 1 is a perspective view of a first embodiment of the present invention.
Figure 2:
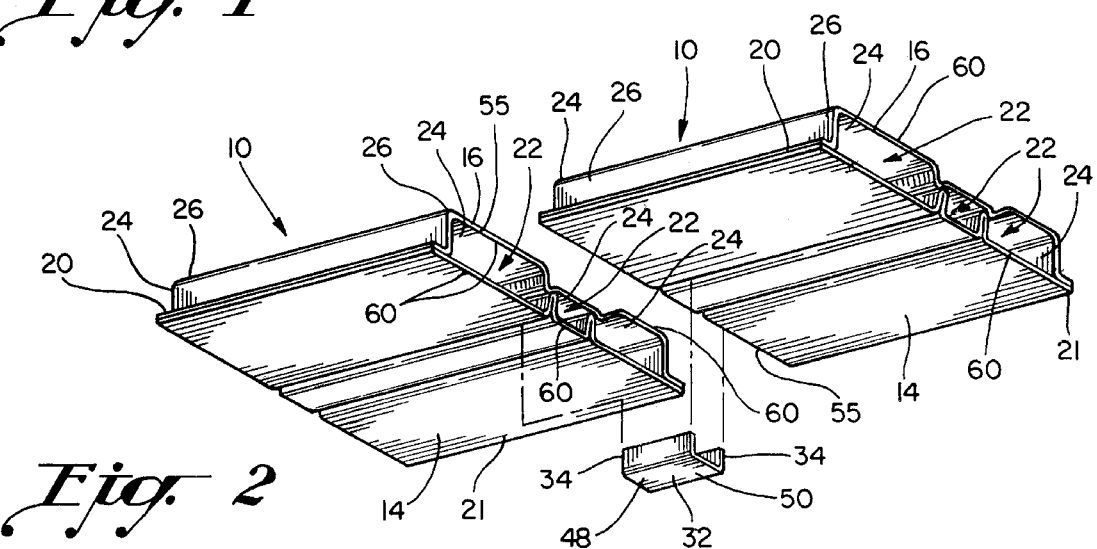
FIG. 2 is an exploded perspective view of FIG. 1.
Figure 3:
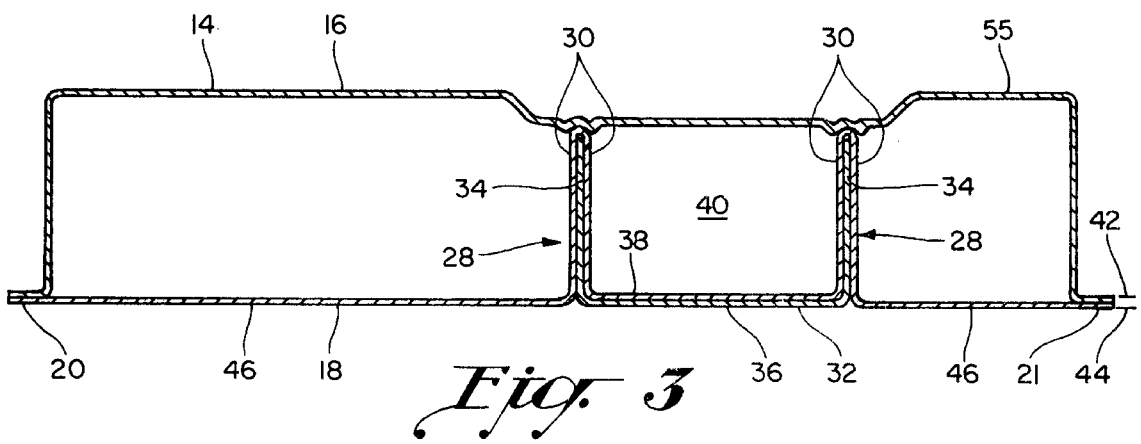
FIG. 3 is an enlarged sectional view taken along line 3—3 of FIG. 1.

Referring now to the drawings, cellular units or structures 10 of a first embodiment are illustrated in FIGS. 1–3 for use in a wiring or electrical distribution system 12 (FIG. 1). The cellular units 10 are oriented in end to end abutting fashion as shown with additional cellular units 10 being similarly aligned as needed.

Each cellular unit 10 includes a metal housing 14 having a top structure 16 and a bottom structure 18 connected to one another, such as with spot welding along lapped opposite edges 20, 21. The top and bottom structures 16, 18 are shaped and configured to define at least three laterally adjacent elongated cells 22 extending through the housing 14. The cells 22 extend parallel to one another and have open ends 24 at opposite ends 26 of the housing 14. The bottom structure 18 includes a pair of sidewall portions 28 (FIG. 3) extending vertically upwardly and in a parallel spaced apart relation to one another. Each sidewall portion 28 includes a pair of opposing sidewalls 30. It may be appreciated that the cellular units 10 as described thus far have been known in the industry, which allows such units to be employed for use in the present invention as hereafter described or with modifications as later described which do not require extensive retooling or design modifications of existing equipment. Accordingly, this embodiment provides a fairly inexpensive solution to the problems previously described.

A metal U-shaped bracket 32 is provided having a pair of bracket sides 34 in parallel spaced apart relation to one another. The opposing sidewalls 30 on each sidewall portion 28 are yieldable to allow a corresponding bracket side 34 therebetween with the opposing sidewalls 30 in pressing engagement to hold the sides 34 in place. A hammer or other blunt object against the bracket 32 may be required to completely engage the sides 34.

Referring to FIG. 3, the sidewall portions 28 extend upwardly from the bottom structure 18 and a center portion 36 of the bracket 32 extends across a cell bottom portion 38 of the bottom structure 18. The cell bottom portion 38 is shown to extend between the sidewall portions 28 of a centermost cell 40. The cell bottom portion 38 extends in a horizontal plane shown generally by the numeral 42 and is positioned above another horizontal plane shown by the numeral 44 that extends through lowermost portions 46 of the bottom structure 18 so that the center portion 36 of the bracket remains generally horizontally flush with the lowermost portions 46. To achieve this flush engagement with the bracket 32, the cell bottom portion 38 is vertically raised approximately 0.0625 inches from the lowermost portions 46.

Referring, to FIG. 1, the bracket 32 extends horizontally outwardly from the housing 14 and parallel with the cells 22. A first portion or end 48 of the bracket 32 is engaged to a cellular unit 10 as described, with an opposite or outwardly extending portion 50 of the bracket 32 extending outward for engagement with sidewall portions 28 of another abutting cellular unit 10 that is similarly constructed. Abutting ends 52 of the cellular units 10 form a butt joint 54 having outermost edges 55 (FIG. 1) of the abutting ends 52 in immediate confronting adjacency with one another with the bracket 32 extending across the butt joint 54 with the bracket sides 34 being positioned between two laterally adjacent cells, for example cells 56, to prevent the ingress of wires 58 at the butt joint 54 from one of the cells 56 to the other laterally adjacent cell 56. Such ingress or crossover of wire would typically occur with conventional cellular units at times when wires are pulled or drawn through the cells for connection. Gaps at the butt joint 54 between abutting ends 52 create this problem for which the present invention solves. Further, the present invention creates proper alignment of the cellular units 10 so that any raw metal edges 60 (FIG. 4) extending about the open ends 24 of the cells 22 are not protruding due to cell misalignment. Such misalignment in conventional cellular units can result in wire stripping as the wires are drawn across these edges 60.

Figure 4:
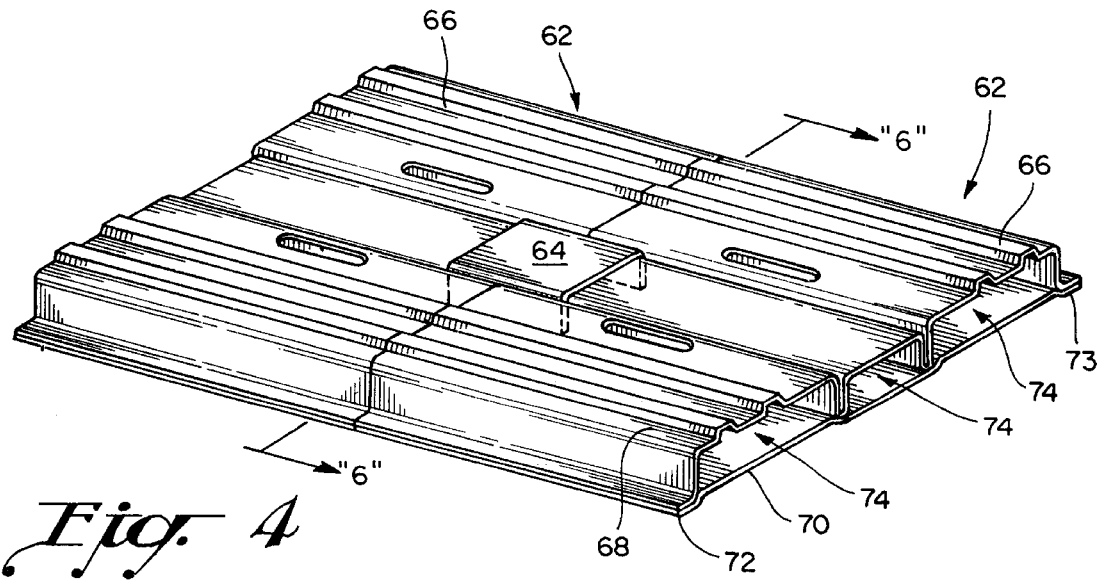
FIG. 4 is a perspective view of a second embodiment of the present invention.
Figure 5:
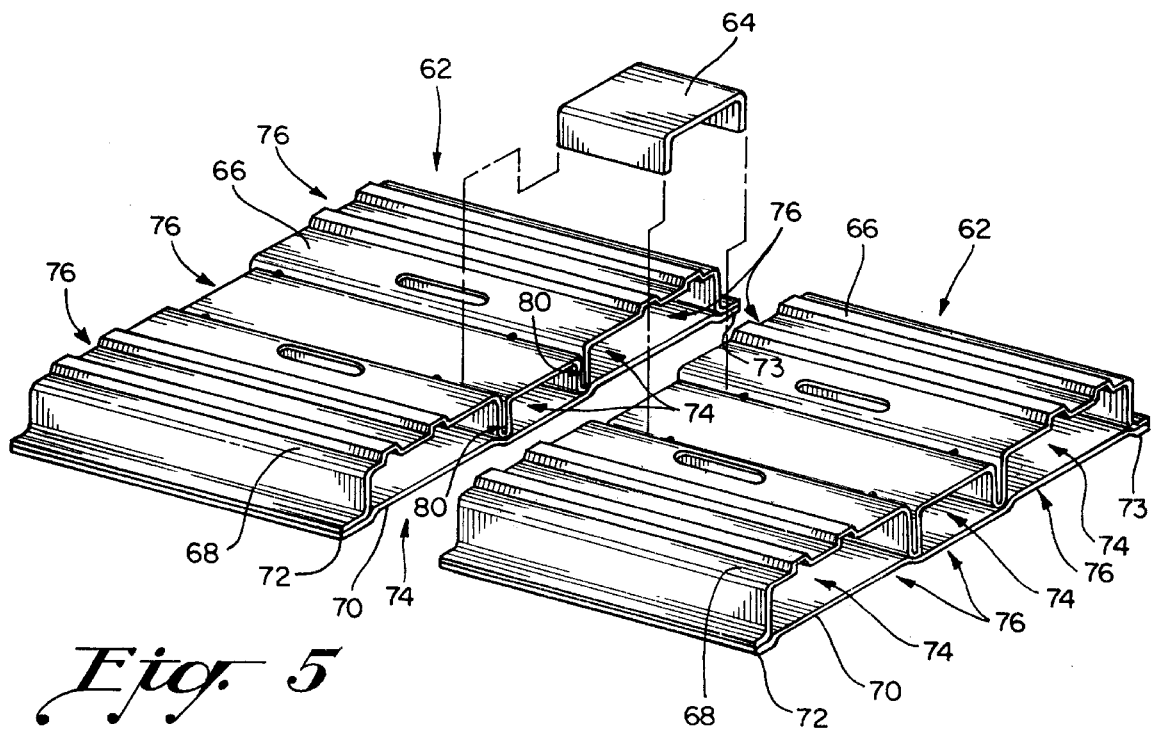
FIG. 5 is an exploded perspective view of FIG. 5.
Figure 6:
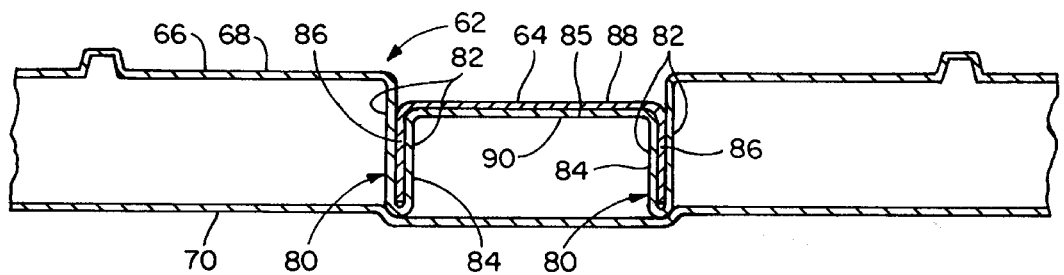
FIG. 6 is an enlarged sectional view taken along line 6—6 of FIG. 4.

Referring to FIGS. 4–6 a second embodiment 62 of the cellular unit is shown and functions similar to that shown and described in the first embodiment, except that the bracket 64, similar to bracket 32, is engaged from the top of the cellular unit 62 instead of the bottom of the cellular unit 10. Cellular unit 62 includes a metal housing 66 having a top structure 68 and a bottom structure 70 connected to one another, such as with spot welding along lapped opposite edges 72,73. The top and bottom structures 68,70 are shaped and configured to define at least three laterally adjacent elongated cells 74 extending through the housing 66. The cells 74 extend parallel to one another and have open ends 76 at opposite ends 78 of the housing 66 (FIG. 5).

Referring to FIG. 6, the top structure 68 includes a pair of sidewall portions 80 extending vertically downwardly and in a parallel spaced apart relation to one another. Each sidewall portion 80 includes a pair of opposing sidewalls 82. Innermost facing sidewalls 84 of the sidewalls 82 may be formed by an inverted U-Shaped channel member 85 that is formed integral with the top structure, or alternatively is connected with the top structure 68 by spot welding, where such a manner of construction known in the industry.

The metal U-shaped bracket 64 of the present invention has a pair of bracket sides 86 in parallel spaced apart relation to one another. The opposing sidewalls 82 on each sidewall portion 80 are yieldable or movable to allow a corresponding bracket side 86 therebetween with the opposing sidewalls 82 in pressing engagement to hold the sides 86 in place. Referring to FIG. 6, the sidewall portions 80 extend downwardly from the top structure 68 and a center portion 88 of the bracket 64 extends across a cell top portion 90 of the top structure 68 or member 84. The cell top portion 90 is shown to extend between the sidewall portions 80 of a centermost cell 92.

Figure 9:
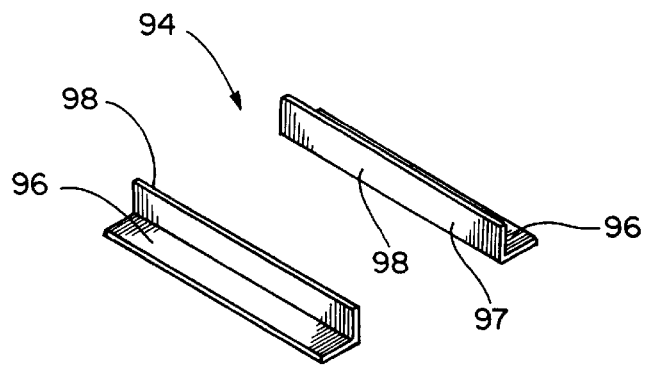
FIG. 9 is a perspective view of an alternative embodiment of the bracket for use with the first and second embodiments.

In an alternative embodiment of the brackets 32,64 used in the first and second embodiment as previously described, FIG. 9 illustrates a bracket 94 comprised of two separable L-shaped members 96. Each L-shaped member 97 has a vertical side 98 forming one of either bracket sides 34,86 where the vertical sides 98 function and connect with sidewall portion 28,80 as shown with respective bracket sides 34,86 in FIGS. 3 and 6.

Figure 7:
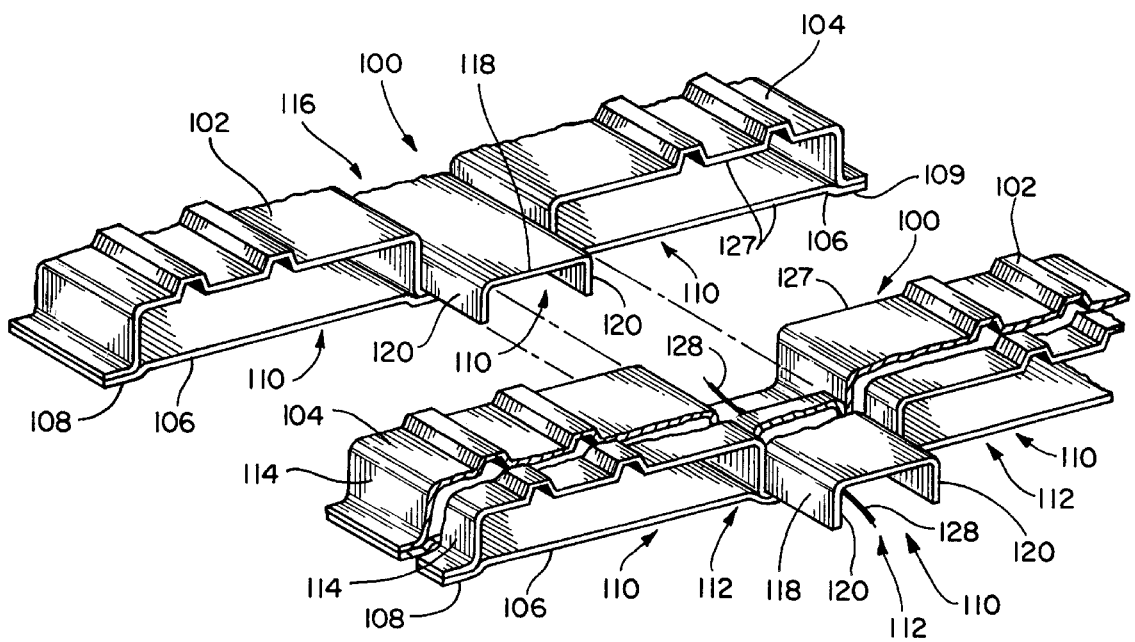
FIG. 7 is an exploded perspective view of a third embodiment.
Figure 8:
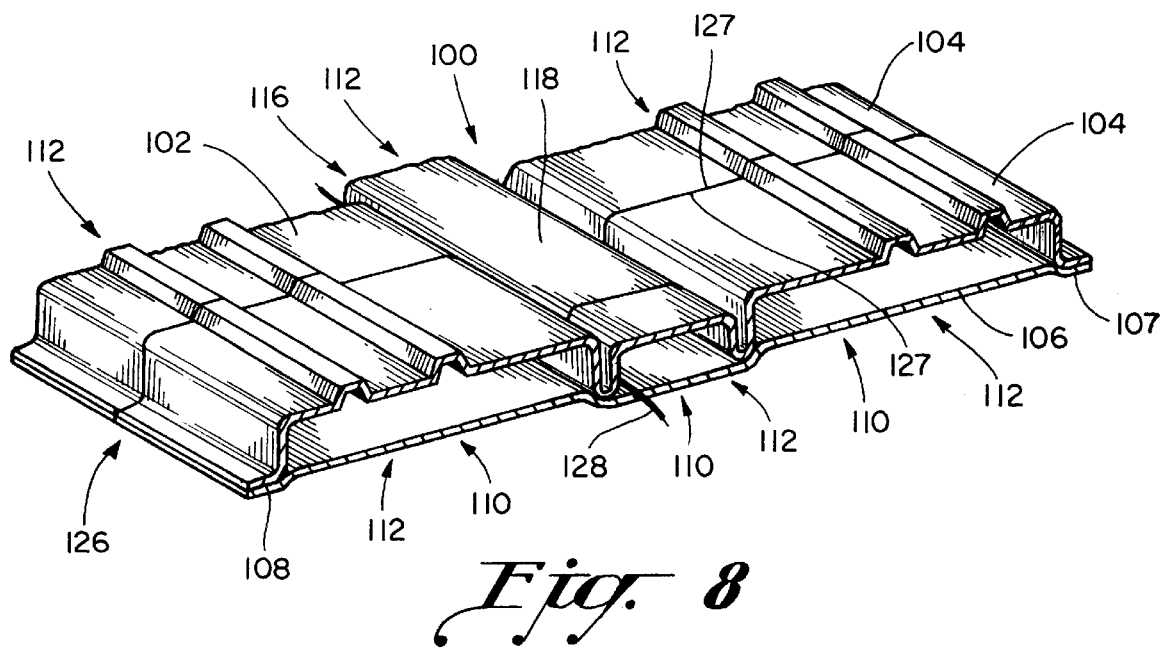
FIG. 8 is an assembled perspective view of the third embodiment.

Referring to FIGS. 7 and 8 a third embodiment 100 of the cellular unit is provided. Cellular unit 100 includes a metal housing 102 having a top structure 104 and a bottom structure 106 connected to one another, such as with spot welding along lapped opposite edges 108,109. The top and bottom structures 104,106 are shaped and configured to define at least three laterally adjacent elongated cells 110 extending through the housing 102. The cells 110 extend parallel to one another and have open ends 112 at opposite ends 114 of the housing 102.

A centermost cell 116 that is positioned between laterally adjacent cells and includes an outwardly extending portion 118 that is U-shaped and has a pair of sides 120 in parallel spaced apart relation to one another. The sides 120 of the outwardly extending portion 118 define portions of opposing cell sides 122 of cell 116. The outwardly extending portion 118 is in lapped engagement with the abutting cellular unit 100, as best illustrated in FIG. 8.

Abutting ends 124 of the cellular units 100 form a butt joint 126 having outermost edges 127 (FIGS. 7 and 8) of the abutting ends 126 in immediate confronting adjacency with one another with the portion 118 extending across the butt joint 126 with the sides 120 being positioned between two laterally adjacent cells to prevent the ingress of wires 128 (FIG. 7) at the butt joint 126 from one of the cells 110 to another laterally adjacent cell 110. The mated or interlocking feature of portion 118 also allows for proper alignment of the cellular units 100.

Although the invention has been described by reference to some embodiments it is not intended that the novel device be limited thereby, but that modifications thereof are intended to be included as falling within the broad scope and spirit of the foregoing disclosure, the following claims and the appended drawings.

I claim:

1. A wiring distribution system including at least two cellular units oriented in end to end abutting fashion, each cellular unit comprising: a housing having a top structure and a bottom structure, the top and bottom structures being adapted and configured to define defining at least three elongated cells extending through the housing, the cells extending parallel to one another and having open ends at opposite ends of the housing, one of said structures including a pair of sidewall portions extending vertically and in a parallel spaced apart relation to one another, each sidewall portion including a pair of opposing sidewalls, and a bracket having a pair of bracket sides in parallel spaced apart relation to one another, the opposing sidewalls on each sidewall portion being yieldable to allow a corresponding one of said bracket sides therebetween the opposing sidewalls in pressing engagement therewith, the bracket extending horizontally outwardly from the housing and parallel with the cells, an outwardly extending portion of the bracket being engageable with sidewall portions of another abutting one of said cellular units such that abutting ends of the cellular units form a butt Joint with the bracket extending across said butt joint with the bracket sides being positioned between two laterally adjacent cells of said cells to prevent the an ingress of wires at the butt Joint from one of said laterally adjacent cells to the other of said laterally adjacent cells.

2. The wiring distribution system of claim 1, wherein the bracket is U-shaped.

3. The wiring distribution system of claim 1, wherein the bracket is comprised of two separable L-shaped members, each L-shaped member having a vertical side forming one of the bracket sides.

4. The wiring distribution system of claim 2, wherein the sidewall portions extend upwardly from the bottom structure and a center portion of the bracket extends across a cell bottom portion of the bottom structure, the cell bottom portion extending between the sidewall portions of one of said cells.

5. The wiring distribution system of claim 2, wherein the sidewall portions extend downwardly from the top structure and a center portion of the bracket extends across a cell top portion of the top structure, the cell top portion extending between the sidewall portions of one of said cells.

6. The wiring distribution system of claim 4, wherein the cell bottom portion of the bottom structure extends in a horizontal plane positioned above another horizontal plane extending through lowermost portions of the bottom structure so that the center portion of the bracket remains horizontally flush with the lowermost portions.

7. The wiring distribution system of claim 6, wherein the horizontal plane of the cell bottom portion is above the horizontal plane extending through the lowermost portions of the bottom structure by approximately 0.0625 inches.

8. A cellular unit for use in a wiring distribution system, the cellular unit comprising: a housing having a top structure and a bottom structure, the top and bottom structures being adapted and configured to define defining at least three elongated cells extending through the housing, the cells extending parallel to one another and having open ends at opposite ends of the housing, one of said structures including a pair of sidewall portions extending vertically and in a parallel spaced apart relation to one another, each sidewall portion including a pair of opposing sidewalls, and a bracket having a pair of bracket sides in parallel spaced apart relation to one another, the opposing sidewalls on each sidewall portion being yieldable to allow a corresponding one of said bracket sides therebetween the opposing sidewalls in pressing engagement therewith, the bracket extending horizontally outwardly from the housing and parallel with the cells, an outwardly extending portion of the bracket being engageable with sidewall portions of a second cellular unit constructed similarly to the cellular unit and oriented in an end to end abutting fashion.

9. The cellular unit of claim 8, wherein the bracket is U-shaped.

10. The cellular unit of claim 8, wherein the bracket is comprised of two separable members, each member having a vertical side forming one of the bracket sides.

11. The cellular unit of claim 9, wherein the sidewall portions extend upwardly from the bottom structure and a center portion of the bracket extends across a cell bottom portion of the bottom structure, the cell bottom portion extending between the sidewall portions of one of said cells.

12. The cellular unit of claim 9, wherein the sidewall portions extend downwardly from the top structure and a center portion of the bracket extends across a cell top portion of the top structure, the cell top portion extending between the sidewall portions of one of said cells.

13. The cellular unit of claim 11, wherein the cell bottom portion of the bottom structure extends in a horizontal plane positioned above another horizontal plane extending through lowermost portions of the bottom structure so that the center portion of the bracket remains flush with the lowermost portions.

14. A cellular unit for use in a wiring distribution system having at least two cellular units oriented in end to end abutting fashion, the cellular unit comprising: a housing including a top structure and a bottom structure, the top and bottom structures being adapted and configured to define defining elongated cells extending through the housing, the cells extending parallel to one another and having open ends at opposite ends of the housing, and means extending horizontally outwardly from the housing parallel with the cells for preventing wire crossing, said means including an outwardly extending portion engageable with an abutting one of said cellular units such that abutting ends of the cellular units form a butt joint having outermost edges of the abutting ends in immediate confronting adjacency with one another with the outwardly extending portion extending from the housing and across said butt joint to define at least one vertical side positioned between two laterally adjacent cells of said cells to prevent the an ingress of wires at the butt joint from one of said laterally adjacent cells to the other of the laterally adjacent cells.

15. The cellular unit of claim 14, wherein the outwardly extending portion is U-shaped having a pair of sides in parallel spaced apart relation to one another, the outwardly extending portion being in lapped engagement with the abutting cellular unit.

16. The cellular unit of claim 15, wherein the sides of the outwardly extending portion define portions of opposing cell sides of one of said cells.

17. The cellular unit of claim 14, wherein one of said structures includes a pair of sidewall portions extending vertically and in a parallel spaced apart relation to one another, each sidewall portion including a pair of opposing sidewalls, the outwardly extending portion being comprised of a bracket having a pair of bracket sides in parallel spaced apart relation to one another, the opposing sidewalls on each sidewall portion being yieldable to allow a corresponding one of said bracket sides therebetween the opposing sidewalls in pressing engagement therewith, the bracket extending from the housing horizontally outwardly parallel with the cells, the outwardly extending portion of the bracket being engageable with sidewall portions of an abutting one of said cellular units.

18. The cellular unit of claim 17, wherein the bracket is U-shaped.

19. The cellular unit of claim 17, wherein the bracket is comprised of two separable members, each member having a vertical side forming, one of the bracket sides.

20. The cellular unit of claim 18, wherein the sidewall portions extend upwardly from the bottom structure and a center portion of the bracket extends across a cell bottom portion of the bottom structure, the cell bottom portion extending between the sidewall portions of one of said cells.

21. The cellular unit of claim 18, wherein the sidewall portions extend downwardly from the top structure and a center portion of the bracket extends across a cell top portion of the top structure, the cell top portion extending between the sidewall portions of one of said cells.

22. The cellular unit of claim 20, wherein the cell bottom portion of the bottom structure extends in a horizontal plane positioned above another horizontal plane extending through lowermost portions of the bottom structure so that the center portion of the bracket remains horizontally flush with the lowermost portions.

23. The cellular unit of claim 22, wherein the horizontal plane of the cell bottom portion is above the horizontal plane extending through the lowermost portions of the bottom structure by approximately 0.0625 inches.

* * * * *